UNITED STATES PATENT OFFICE.

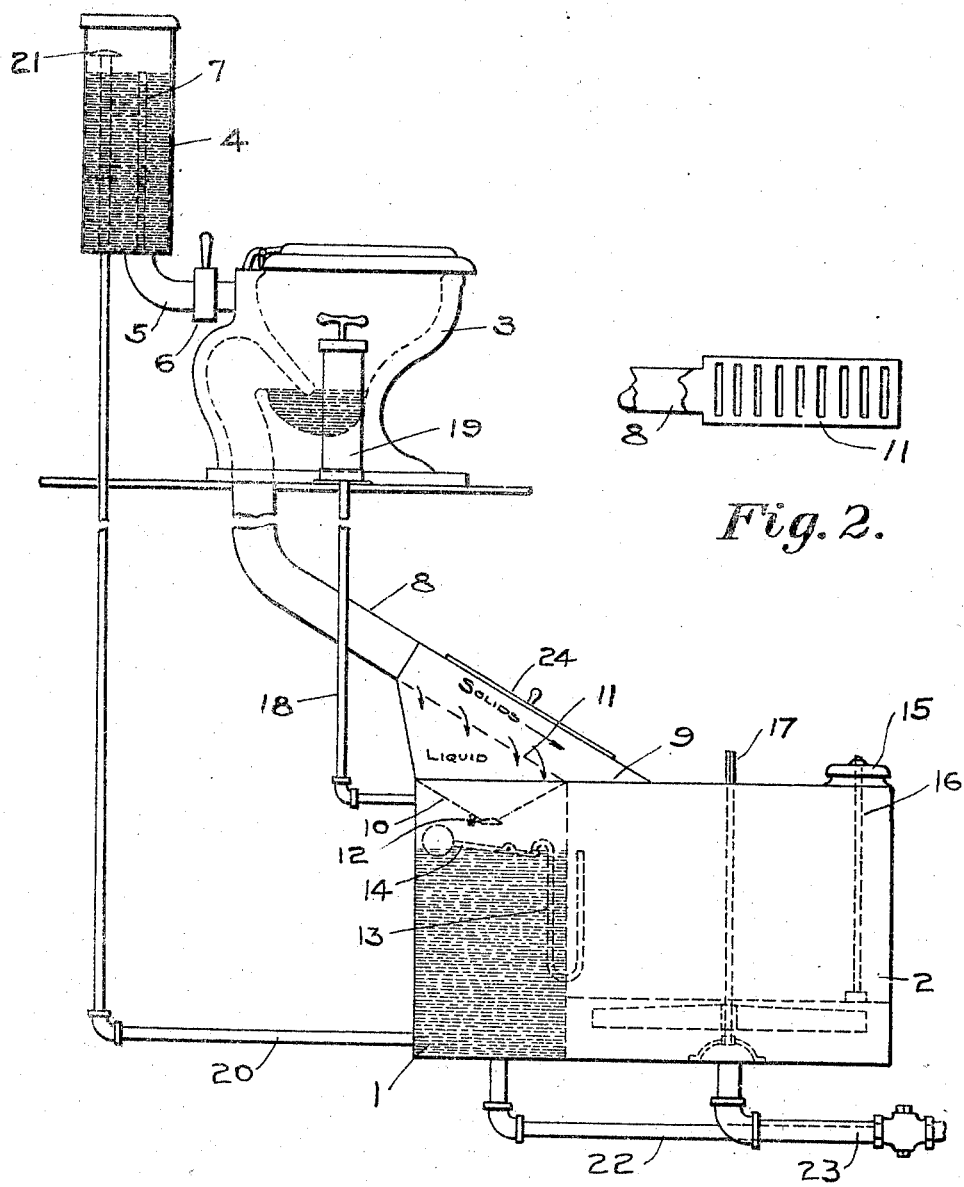

EARLE T. MONTGOMERY, OF ALFRED, NEW YORK.

SANITARY CLOSET STRUCTURE.

1,303,358.　　　　　　　Specification of Letters Patent.　　Patented May 13, 1919.

Application filed June 21, 1915.　Serial No. 35,206.

*To all whom it may concern:*

Be it known that I, EARLE T. MONTGOMERY, a citizen of the United States of America, residing at Alfred, in the county of Allegany and State of New York, have invented certain new and useful Improvements in Sanitary Closet Structures, of which the following is a specification.

My invention relates to a sanitary closet structure. It is particularly adaptable to those localities wherein there is no municipal or community sewage disposal system, being intended for use either in connection with a water supply or independently.

My invention is particularly directed to the provision of an apparatus whereby the closet may be flushed and then the sewage may be automatically divided, the fluids passing to one tank and the solids to another. After this automatic division, I have provided apparatus which is adapted to use the fluids over and over again for flushing the closet, these fluids being constantly subjected to treatment by a disintegrating and sterilizing medium.

In the system illustrated and to be described in detail with reference to the drawings, the soil pipe of the closet leads to a deposit tank for the solids and passes the sewage over a screen through which the fluid enters into a separate compartment. The tank for the solids is intended to contain a strong solution of disintegrating and sterilizing chemical or destroying all organic matter and germ life while the tank for the fluid is air-tight and provided with apparatus for elevating the fluid to the flush tank of the closet. In the structure shown, this elevation is accomplished by a hand pump located at the closet and operable to increase the air pressure in the fluid tank and thus force the fluid into the flushing tank.

The preferred apparatus of my invention is shown in the accompanying drawings wherein Figure 1 is a side elevation of my system.

Fig. 2 is a detail in plan of the screen over which the sewage is designed to pass before reaching the discharge end of the soil pipe.

In the drawings, the deposit tank comprises a compartment 1 preferably air-tight for the reception of the fluids of the sewage and a compartment 2 in which is maintained a strong chemical solution for the reception and disintegration of the solids. At a comparatively remote point there is a closet 3 of normal form carrying a flush tank 4 and connected thereto by a pipe 5 having a controlling valve 6. This flush tank is provided with an overflow pipe 7.

Leading from the closet 3 is a soil pipe 8 which is designed to conduct the solids directly into the compartment 2 through orifice 9. In the top of the fluid compartment 1 is a funnel 10 covered by a screen 11 forming a gate-way for the fluids passing through the soil pipe 8 with the solids to this point. In the bottom of this funnel is a valve structure 12 permitting the downward passage of the fluid and yet normally maintaining the compartment 1 air-tight.

Between the compartments 1 and 2 there is a siphon pipe 13 normally closed by a float valve structure 14 and permitting the fluid from this compartment 1 to pass into the compartment 2 when the fluid in the first compartment reaches a definite level.

The compartment 2 is normally closed tightly by a cap 15 having a level indicator 16 which raises and lowers with the substances in the tank compartment 2. In addition this compartment 2 is provided with a stirring device 17, having a square upper end for occasional rotation.

A pipe 18 leads into the upper end of the compartment 1 and air may be forced through this pipe into the compartment by a pump 19. When this happens, the fluid in the compartment 1 will be forced outwardly through the pipe 20 and into the flush tank 4. The upper end of this pipe is hooded as at 21 to prevent splashing against the cover of the flush tank. The compartment 1 may be emptied through the valve control pipe 22 and the compartment 2 may be emptied through the valve control pipe 23. The soil pipe 8 is provided with a cover 24 for the hopper or funnel 10 so that the screen 11 may be more readily accessible.

In operation, flushing of the closet is effected by actuation of the valve 6 and the waste matter passes downwardly through the soil pipe 8. The solids pass directly through the orifice 9 into the compartment 2 and the fluids mixed with the chemical flushing solution passes through the screen 11 and valve 12 into the compartment 1. The fluid in the compartment 1 may then be forced back to the flush tank 4 by operation of the hand pump 19. When the fluid in the compartment 1 rises beyond a definite level, the float valve structure 14 permits passage of this fluid through the siphon pipe 13 into the compartment 2. The level of the matter of the compartment 2 is indicated by level indicator 16. In addition, it is ocasionally advisable to stir the contents of the compartment 2 by the stirring device 17. Emptying of the compartments 1 and 2, may be effected by the pipes 22 and 23, these pipes being independent of each other.

The use of a flushing fluid for conducting the sewage to a disintegrating fluid is further advantageous because it renders possible the installation of a closet in a second or third story of a house inasmuch as the flushing fluid may be made to conduct the sewage for considerable distances in pipes with an ultimate purpose of depositing the solids in a tank for chemical disposal. Other devices using a disintegrating fluid have been limited to first floor installation because of the lack of a conveying medium for the sewage. With my method and system, the flushing fluid may be caused to convey the sewage, whether such flushing fluid be water or a disintegrating and germ-destroying chemical. It will be apparent that with my improvement the location of the deposit tank may be a considerable distance away from the bowl either in a perpendicular line or a comparatively great distance to one side. For instance the tank may be located in the yard if there is no basement or cellar in which said tank can be installed.

Having thus described my invention, what I claim is:

1. A sanitary closet structure comprising a deposit bowl, a tank, a passageway from said bowl to said tank with a perforate portion to separate the fluids of the sewage from the solids while such solids are passing toward said tank.

2. A sanitary closet structure comprising a deposit bowl, a tank for the reception of the solids of the sewage, and means for separating the liquids from the sewage before the solids reach said tank and re-using such liquids for flushing.

3. A sanitary closet structure comprising a deposit bowl, a flushing means, a tank, means for delivering the sewage into said tank but first diverting the fluids therefrom, and means for returning said diverted fluids to said flushing means for re-use.

4. A sanitary closet structure comprising a deposit bowl, a tank, means for delivering the sewage into said tank but first diverting the fluids therefrom, and a tank to receive said diverted fluids.

5. A sanitary closet structure comprising a deposit bowl, a flushing means, a tank, means for delivering the sewage into said tank but first diverting the fluids therefrom, a tank to receive said diverted fluids, and means for returning said diverted fluids to said flushing means.

In testimony whereof I hereby affix my signature.

EARLE T. MONTGOMERY.

Copies of this patent may be obtained for five cents each, by addressing the "Commissioner of Patents, Washington, D. C."